United States Patent
McCutcheon

(10) Patent No.: US 8,412,610 B2
(45) Date of Patent: Apr. 2, 2013

(54) METHOD AND SYSTEM FOR PREPARING AN EMPLOYEE BENEFITS PLAN

(75) Inventor: Timothy M. McCutcheon, Milwaukee, WI (US)

(73) Assignee: CCH Incorporated, Riverwoods, IL (US)

( * ) Notice: Subject to any disclaimer, the term of this patent is extended or adjusted under 35 U.S.C. 154(b) by 11 days.

(21) Appl. No.: 13/248,526

(22) Filed: Sep. 29, 2011

(65) Prior Publication Data

US 2012/0084221 A1 Apr. 5, 2012

Related U.S. Application Data

(63) Continuation of application No. 12/894,315, filed on Sep. 30, 2010, now abandoned, which is a continuation of application No. 11/017,343, filed on Dec. 20, 2004.

(51) Int. Cl.
G06Q 40/00 (2006.01)

(52) U.S. Cl. ..................................... 705/36 R
(58) Field of Classification Search .............. 705/35, 705/36 R, 36 T, 37, 4
See application file for complete search history.

(56) References Cited

U.S. PATENT DOCUMENTS

| | | | | |
|---|---|---|---|---|
| 6,041,313 A * | 3/2000 | Gilbert et al. | ............... | 705/36 R |
| 6,067,522 A * | 5/2000 | Warady et al. | ................. | 705/2 |
| 6,615,253 B1 * | 9/2003 | Bowman-Amuah | .......... | 709/219 |
| 2001/0037276 A1 * | 11/2001 | Kelly et al. | ............... | 705/36 |
| 2005/0137967 A1 * | 6/2005 | Ryan | .................. | 705/38 |
| 2006/0095307 A1 * | 5/2006 | Stevenson et al. | .............. | 705/7 |
| 2006/0095316 A1 * | 5/2006 | Stevenson et al. | .............. | 705/11 |
| 2007/0005463 A1 * | 1/2007 | Davis et al. | ............... | 705/34 |
| 2008/0059345 A1 * | 3/2008 | Dema | .................. | 705/30 |
| 2010/0010909 A1 * | 1/2010 | Marshall et al. | .............. | 705/26 |
| 2010/0228599 A1 * | 9/2010 | Mamorsky | .............. | 705/10 |
| 2011/0145166 A1 * | 6/2011 | Kmak et al. | .............. | 705/36 R |

OTHER PUBLICATIONS

"SunGard Corbel Introduces Relius TM Government Forms 5500 Client Version—New Technology Automates Delivery of 5500s to Plan Sponsors", publication date: Jun. 24, 2002.*

* cited by examiner

Primary Examiner — Greg Pollock
(74) Attorney, Agent, or Firm — Boyle Fredrickson, S.C.

(57) ABSTRACT

A system for preparing an employee benefits form for, e.g., ERISA includes a server in support of a website, and a processor in communication with the server and a memory. The memory includes a program for automatically preparing a benefits form and/or plan via the internet. The program includes instructions to the processor for retrieving previously filed data from a public database, converting and storing into a database, searching the database for a desired portion of the data, and populating the entries of the form. The website connection also allows a remote user to periodically update the benefit data.

11 Claims, 2 Drawing Sheets

METHOD AND SYSTEM FOR PREPARING AN EMPLOYEE BENEFITS PLAN

CROSS-REFERENCE(S)TO RELATED APPLICATION(S)

This application is a continuation of and claims priority to U.S. Ser. No. 12/894,315 filed Sep. 30, 2010, now abandoned which was co-pending at the time of filing the present application, the entire contents of which are hereby expressly incorporated by reference into the present application. Application Ser. No. 12/894,315 is a continuation of application Ser. No. 11/017,343 filed on Dec. 20, 2004.

FIELD OF THE INVENTION

The invention relates to a system for and a method of preparing an employee benefits plan. The invention more particularly relates to a system for and a method of preparing an employee benefits plan that includes searching and automatically populating an employee benefits form with previously filed benefit data in response to a request submitted via an internet connection.

BACKGROUND OF THE INVENTION

Each year, a sponsor of an employee benefit plan that is subject to the Employee Retirement Income Security Act (ERISA) must file certain information with the government. Essentially, ERISA requires the filing of certain forms used to report and disclose information concerning employee benefit plans to the Department of Labor (DOL), the Internal Revenue Service (IRS), and plan participants and beneficiaries on an annual basis.

Among the ERISA requirements, plan administrators of employee benefits plans are required to file a Form-5500 in regard to the proper operation and management of the employee benefit plans. Each Form-5500 may be filed in one of three ways: (1) electronically, (2) via a paper form that incorporates computer-generated two-dimensional bar code that encodes each answer on the form, and (3) via a special paper form that is printed in an optical character recognition format. The DOL/IRS processes these filings and creates an electronic database of all Form-5500 filings for each year. The freedom of Information Act (FOIA) has made available these Form-5500 filings with the DOL/IRS available to the public.

It is known that completion of these ERISA forms such as the Form-5500 requires significant effort. Almost all administration of employee benefit plans is performed by third party administrators and advisors (collectively "TPAs") which are not affiliated with the employer sponsoring the employee benefit plan, hereafter referred to as a "plan sponsor" (although a few plans are self administered by the plan sponsors). The TPAs generally rely on software configured to establish, administer, and terminate employee benefit plans (collectively referred to as "employee benefit software").

However, known employee benefit software packages have certain drawbacks. For example, known employee benefit software packages generally require at some point that the user complete a checklist that includes questions about the employee benefit plan. The user generally must perform a certain amount of due diligence to obtain, as well as manually enter, this requested information into the employee benefit software package. Typically, this requested information is obtained through inquiries to the plan sponsor and its advisors. This employee benefit information is otherwise obtained by searching for, obtaining copies of, and manually transferring information from paper copies of previous Form-5500 filings. The data entry is time-consuming, tedious and prone to error. Moreover, copies of previous Form-5500 filings are often difficult to obtain where there is a turnover of the previous TPAs that were administering the plans such that a new TPA must obtain plan information from other sources.

Therefore, there is a desire for an enhanced system for and method of preparing an employee benefit plan that simplifies the search for, possession, and entry of requested information in accordance with ERISA regulations.

SUMMARY OF THE INVENTION

The present invention provides a system for and a method of preparing an employee benefit plan that meets the desires and needs described above. The system of the present invention thus enhances the search for, possession, and entry of requested information for preparing an employee benefit plan and/or form in accordance with regulatory reporting requirements (e.g., ERISA, etc.).

In a first embodiment of the present invention, a system for automatically populating an employee benefits form is provided. The system is generally configured for preparing an employee benefits form for reporting employee benefit in response to a request from a user at a remote computer station. The system is in communication with a public electronic data base having previously filed benefit data from one or more previously filed benefits forms. The system includes a server configured to receive the request from the user at the remote computer station via an internet connection. The system is operable to distinguish an identifier in the request for a desired portion of previously filed benefit data to be entered into a new benefits form. The system further includes a processor in communication with server and a memory. The memory includes a software program having a plurality of software portions with instructions to the processor to execute the following: retrieving the plurality of previously filed benefit data available on the electronic public database via the server, storing the plurality of previously filed benefit data into an integrated database in the memory of the main computer station, searching the integrated database based on the identifier for the desired portion of previously filed benefit data, and populating the plurality of entries of the new benefits form with the plurality of previously filed benefit data associated with the identifier provided by the user.

The preferred system is configured to automatically populate a Form-5500 benefits form in accordance with the regulatory reporting requirements under ERISA. The preferred system is configured to support a website operable to interact with the user at the remote computer station via an internet connection. The preferred memory includes instructions configured to instruct the processor to support the website. The website includes one or more web pages for display at the remote computer station that prompt the user to provide the identifier in the request. The preferred identifier includes an employer identification number, a designation of an employer benefit plan, and/or a designation of an employer.

The preferred system further includes a software portion configured to instruct the processor to perform the step of storing the plurality of previously filed benefit data, as well as a software portion configured to instruct the processor to perform the step of converting the retrieved plurality of previously filed benefit data into a format searchable by the software program based on the identifier in the user request. The preferred system further includes an output configured to communicate the an electronic version of the new benefits form, including the plurality of previously filed benefit data populating the entries of the benefits form, to the remote computer terminal for display. Upon review of the completed new benefits form, the main computer station is configured to receive a change in benefit data from the user at the remote computer station via the internet connection. The software program includes a portion with instructions to the processor for populating the benefits form with the change in benefit data communicated from the remote computer terminal. The software program also includes instructions to instruct the processor to periodically update the integrated database stored in the memory with previously filed benefit data retrieved from the public database.

The present invention also provides a system for creating an employee benefits plan in response to a request from a user at a remote computer station. The system includes a server in support of a website accessible by the remote computer station via an internet connection, and a main computer station in communication with the server. The main computer station includes a processor and a memory configured to instruct the processor to execute a plurality of instructions of a software program stored in the memory. The software program is comprised of a series of software portions, including the following: a plan document generation portion configured to create one of a plurality of options of benefits plan templates; an IRS/PBGC portion configured to generate and populate one or more benefits forms applicable to the IRS or the DOL; a 1099-R portion configured to generate and populate a 1099-R benefits form and a IRS 945 benefits form; a Form-5500 portion configured to generate and populate a Form-5500 benefits form and a plurality of schedules associated thereto along with applicable bar codes; and a proposal testing portion configured to define a benefit contribution, a traditional defined contribution, and a cross-tested defined contribution, as well as configured to provide year-end compliance testing.

Furthermore, the present invention provides a method of populating one or more entries of an employer benefits form. The method includes the steps of receiving a request to populate the benefits form with the portion of the plurality of previously filed data associated with the request, the request including an identifier to recognize the portion of the previously filed data desired by the user; retrieving the previously filed benefit data available on the electronic public database via the input, storing the plurality of previously filed benefit data into an integrated database in the memory of the main computer station, searching the integrated database based on the identifier for the desired portion of previously filed benefit data, and populating the plurality of entries of the benefits form with the plurality of previously filed benefit data desired by the user. The step of retrieving the previously filed benefit data can be via an internet connection, or by a CD Rom or other form of media.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying figures in which like reference numerals represent like parts throughout.

DETAILED DESCRIPTION OF THE PREFERRED EMBODIMENTS

In describing the preferred embodiment of the invention that is illustrated in the figures, specific terminology will be resorted to for the sake of clarity. However, it is not intended that the invention be limited to the specific terms so selected and it is to be understood that each specific term includes all technical equivalents that operate in a similar manner to accomplish a similar purpose.

Figures 1, 3:
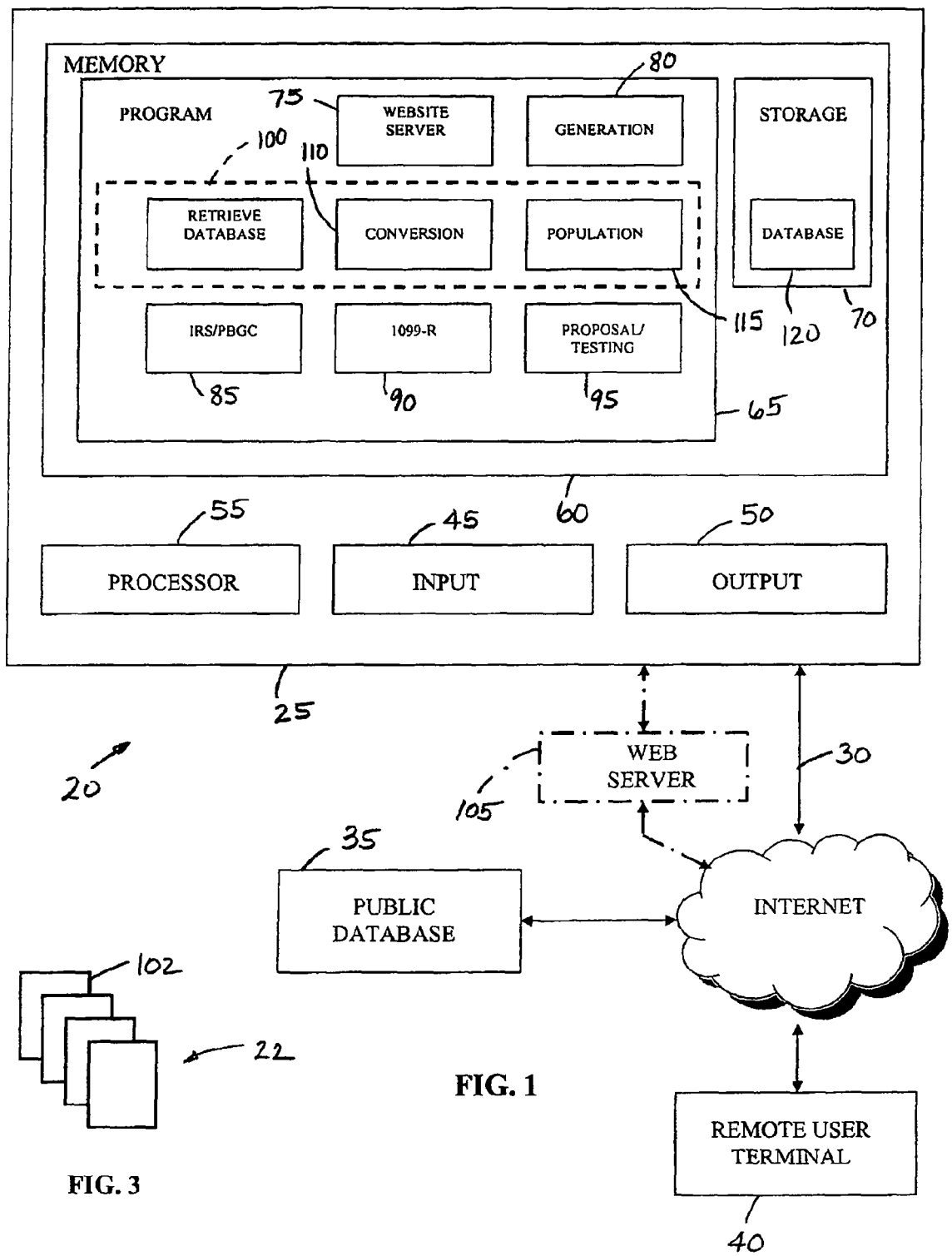
FIG. 1 schematically illustrates one embodiment of a system for automatically populating an employee benefit reporting form, e.g., Form-5500, in accordance with the present invention.
FIG. 3 schematically illustrates an employee benefit plan that includes a Form-5500 benefits form in accordance with the present invention.

FIG. 1 schematically illustrates one embodiment of a system 20 for creating an employee benefit plan 22 (See FIG. 3) in accordance with the present invention. The employee benefit plan 22 generally includes a series of entries for benefit data in regard to employee benefits for an employee as well as according to regulatory reporting requirements (e.g., Employee Retirement Income Security Act (ERISA)). The system 20 generally includes a main computer station or terminal 25 configured to communicate 30 with a public database 35 as well as with a user at a remote computer terminal 40. The communication with the public database may be made any method including, but not limited to, electronic connection, internet connection, modem, or physical media (CD ROM, disk, diskette, tape, etc.). For purposes of this application, communication with the public database shall be deemed to embody the foregoing.

The preferred main computer station 25 illustrated in FIG. 1 generally includes an input 45, an output 50, a processor 55, and a memory 60. The input 45 (e.g., a keyboard, a mouse, a touch-screen, modem, web server, etc.) is generally configured to receive requests, benefits information/data, etc. either retrieved via the internet connection 30 or manually entered by an operator at the main computer station 25. The output 50 (e.g., modem, server, etc.) is generally configured to enable the main computer station 25 to send a work product (e.g., a completed employee benefits reporting form) or other output (e.g., web page, etc.) to the user at the remote computer terminal 40 via the internet connection 30. Also, the output 50 of the main computer station 25 is configured to file an employee benefits reporting form or plan including completed entries in an electronic format to another recipient (e.g., respective government agency, plan administrator, or sponsor) designated by the user. The output 50 can further include a monitor, screen, speaker, or the like configured to display and interact with the operator at the main computer station 25.

The memory 60 generally includes a program memory 65 and a random storage memory 70. The program memory 65 is essentially configured to store instructions for execution by the processor 55 in a known manner. The storage memory 70 is configured for the storage of benefit data and/or user profiles of clients accessing and employing the system 20.

The program memory 65 includes software having a series of software portions or modules that each include instructions to the processor 55 for executing or performing certain functions. The preferred plurality of software portions includes a web server portion 75 in combination with a series of other software portions for creating the employee benefits plan 22. The preferred software portions for creating the employee benefits plan includes a plan document generation portion 80, a IRS/Pension Benefit Guarantee Corporation (PBGC) form portion 85, a 1099-R form portion 90, a proposal/testing portion 95, and a Form-5500 portion 100.

The web server portion 75 is configured to support a website in a known manner that is operable to communicate one or more web pages over an internet connection via a browser to the remote computer terminal 40. Alternatively, a stand-alone web server (illustrated in dashed line and reference 105) can be used to support the website in a known manner and to communicate with the main computer station 25.

The plan document generation portion 80 is configured to create one of a series of options: including, but not limited to, pre-approved or non pre-approved plans, a prototype non-standardized option, a prototype standardized option, a volume submitter non-standardized option, an individually drafted option, an IRS submission document option, or a summary plan description option.

The prototype, volume submitter and individually drafted options include an adoption agreement and a basic plan document comprised of all types of benefit plans including 401k/profit sharing portion, a money purchase plan portion and target benefit plan portion, defined benefit portion, and an ESOP portion. The IRS submission document option includes all governmental forms other than Form 5500 and includes a Form-5307, a schedule Q, a Form-8717, a Form-2848, a notice to interested parties, and an IRS cover letter. One or more of the various options can include a checklist that provides instant context-sensitive help as well as extensive online error correction. Each of the above-described software portions for creating a benefit plan 22 can further include one or more default checklists that are used to provide the initial answers to all checklist answers for new plans. The default checklist can further include standard provisions typically included in each type of document/form employed in the employment benefit plan 22. In addition, many other documents are available including a summary plan description, consents and other forms used in the administration of benefit plans.

Each of the above-described software portions are configured to be periodically updated (e.g., the website server portion 75) such that there is no software to download to or install at the remote computer terminal 40. Thus, this follows an Application Service Provider (ASP) software vendor model. All of the features of the plurality of software portions are integrated to inter-communicate with one another using a consistent user interface of the website supported by the web server portion 75. In addition, the system 20 is configured to periodically update the above-described software portions with the most recent versions of the applicable electronic employee benefits forms employed by the system 20 to comply with regulatory reporting requirements.

Also, the system 20 in combination with the website is configured to allow the user to setup a user profile (e.g., company name, address, name of benefit plan, etc.) that is stored in the memory 60 of the system 20 and that is employed by the system 20 in labeling the documents and/or forms associated with the employee benefit plan 22. The label would preferably automatically appear in the appropriate place(s) on each applicable document prepared for the user.

The following generally describes a series of the software portions configured for automatically populating a benefits form 102 (See FIG. 3) in accordance with the present invention. Although the following description of populating the benefit form 102 is specifically in reference to the Form-5500 in accordance with the Form-5500 portion 100 of the software, the invention is not so limited. The system 20 described below is applicable to automatically populating any type (e.g., refer to description of benefit plan 22 above) of benefit form 102, as well as various other forms or checklists, that may or may not be associated with creating an ERISA benefit plan 22, and in accordance with regulatory reporting requirements (e.g., ERISA, etc.) and is not limiting on the invention.

The Form-5500 portion 100 includes instructions and entries to file employee benefit information or data concerning employee benefits in accordance with ERISA. Employers and plan administrators that comply with the instructions for the Form-5500 and schedules related thereto will essentially satisfy the benefit plan reporting requirements by the IRS and/or the DOL. The series of entries in the Form-5500 generally reflect the characteristics and operations of the employee benefit plan 22. The Form-5500 reporting requirements include pension benefit schedules, financial schedules (e.g., schedule of assets, schedule of transactions, insurance information, etc.), large and small pension benefit plan schedules, welfare benefit plan schedules, direct filing entity (DFE) transaction schedules, etc. depending upon the type of filing entity and/or the employee benefit plan 22.

The preferred Form-5500 portion 100 includes a retrieve database portion 105, a conversion portion 110, and a population portion 115 that act in combination to automatically populate the Form-5500 employee benefit reporting form.

The retrieve database portion 105 is generally configured to instruct the processor 55 to retrieve previously filed or submitted employee benefit data associated with previously filed employee benefits data and/or forms from the public database 35. The previously filed benefit data and/or forms submitted to the DOL/IRS database is available to the general public by means of a request under the Freedom of Information Act (FOIA). The previously filed employee benefit data is preferably received at the main computer station 25 via the interne connection 30. Yet, it is understood that the mode of communication (e.g., internet, diskette, etc.) in obtaining the previously filed employee benefit data in accordance with a FOIA request can vary and is not limiting on the invention. Typically, the previously filed employee benefit data provided by the public database is in the form of text files containing the previous Form-5500 benefit data and/or filings associated with one or previous years as desired in the FOIA request.

The conversion portion 110 is configured to convert the plurality of flat files retrieved from the public database 35 to an integrated, database 120 in a searchable format for storage in the memory 60 of the main computer station 25. Alternatively, the database 120 may be located at the stand-alone web server 105 (shown in dashed line) or on a separate computer station (not shown) in communication with the main computer station 25 and/or the web server 105.

The population portion 115 of the software is configured to search the integrated database 120 of the main computer station 25 for a desired portion of the previously filed employee benefit data associated with an identifier in the user request. The search can be conducted using various known identifiers (e.g., the name of an employee benefits plan, the employer name or the employer identification number, etc.). It is understood that the type of identifier (e.g., text, numerals, strings, etc.) to distinguish a desired portion of the previously filed employee benefit data in the integrated database 120 can vary and is not limiting on the invention. The population portion 115 can be further configured to establish, administer, and/or terminate a benefit form 102 or employee benefit plan 22 as desired by the user.

After locating the desired particular previously filed form data in the database 120, the population portion 115 is configured to automatically populate the series of entries of an electronic version of a new or blank employee benefits reporting form with the previously filed benefit data. The electronic-version of the blank employee benefits form is stored in the memory 70 and accessible by the processor 55. The population portion 115 of the software relieves the need to manually enter benefit data as is required with known employee benefit software packages. This feature is especially helpful in situations (such as a TPA acquiring a new employee benefit plan client) where a user has not previously entered or submitted employee benefit information to a former TPA. Thereby, a new TPA is saved a great deal of time in locating and entering the appropriate employee benefit information.

Figure 2:
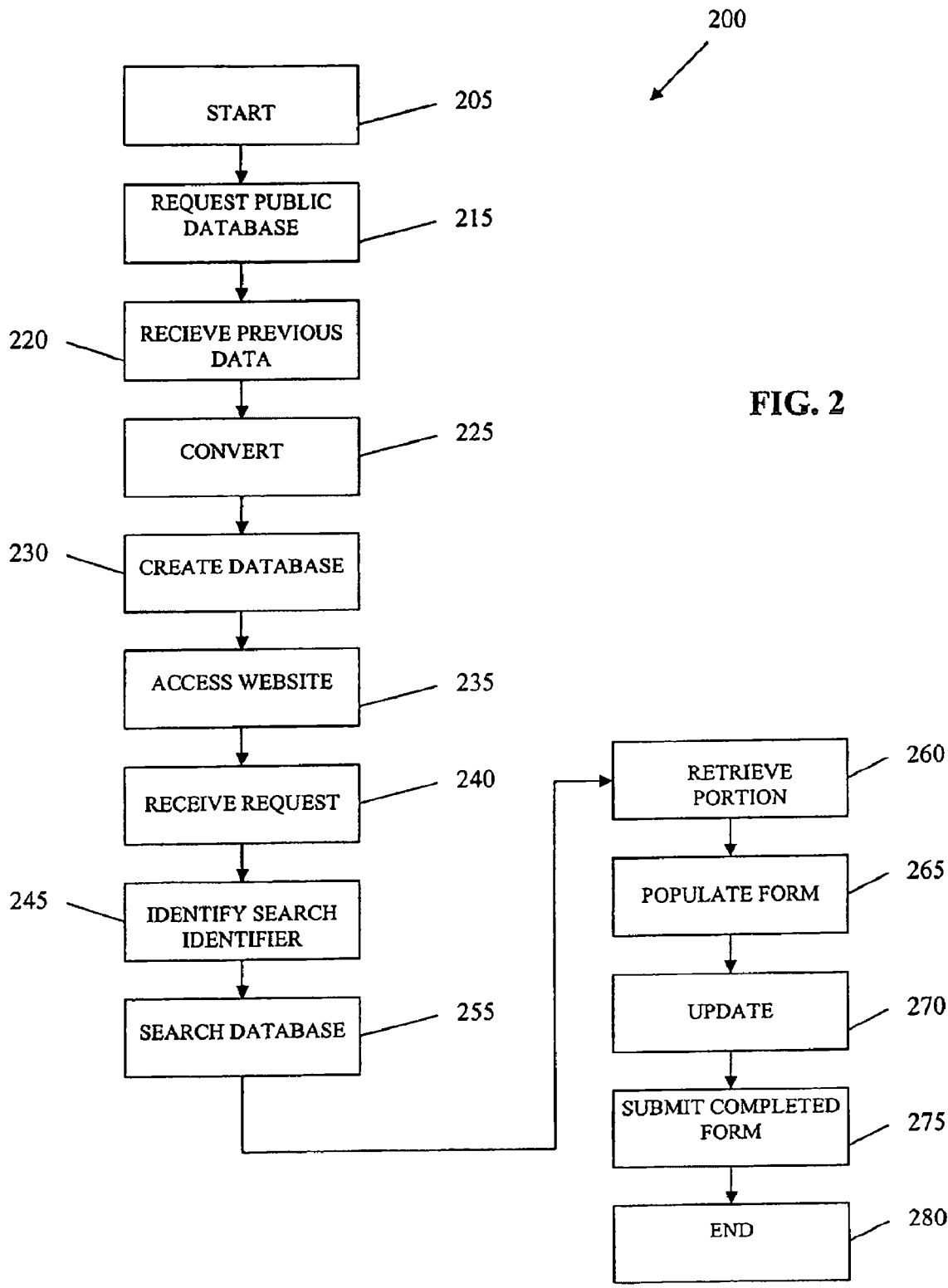
FIG. 2 schematically illustrates one embodiment of a method of automatically populating an employee benefit reporting form in accordance with the present invention.

FIG. 2 schematically illustrates one embodiment of a method 200 of automatically populating an employee benefits form (e.g., the Form-5500 employee benefit reporting form) in accordance with the present invention. Step 205 is the start of the method 200. Step 215 includes requesting (e.g., under the FOIA) the previously filed employee benefit data from the public database 35 via a communication over the internet connection 30. Step 220 includes receiving the previously filed benefit data in the flat file format from the public database 35 via the internet connection 30. As noted above, the previously filed benefit data can be retrieved via a CD Rom, diskette, or via another known media.

Step 225 includes converting the previously filed benefit data into a format searchable and retrievable by the population portion 110 to enable automatic population of the series of entries of an electronic version of the employee benefits form. Step 230 includes creating and storing the previously filed data in the integrated, searchable database 120 in the memory 60 of the main computer station 25. The memory 60 is configured to be accessible by the processor 55 via instructions respective software instructions in the program memory 65 and/or the web server 105. Steps 215 through 230 may be repeated as the previously filed benefits data is updated by the system 20 from the publicly available database 35.

At step 235, a user at the remote computer terminal 40 accesses the website supported by the main computer station 25 or stand-alone web server 105 via the internet connection 30. Step 240 includes receiving a request from the user to populate a new employee benefits form with a desired portion of previously filed data associated. Step 245 includes receiving one or more identifiers of the desired portion of previously filed employee benefit data to populate the entries of the new employee benefits form. The identifier includes any text or numeral or string or the like or combination thereof that allows the population portion 115 to recognize the desired portion of previously filed data.

In response to the request, step 255 includes searching the integrated database 120 for the portion of previously filed data associated with the identifier. Step 260 includes retrieving the portion of the previously filed data associated with the identifier from the database 120 and making this benefit data available to the population portion 115 of the software in the program memory 65. Step 265 includes populating each of the series of entries of the electronic-version of the new benefits form with the portion of the previously filed data associated with the identifier. Step 270 includes updating one or more of the series of entries of the new benefits form in response to prompts from the web pages of the website displayed to the user at the remote terminal 40.

Step 275 includes submitting and displaying the completed electronic version of the benefits form with the entered desired portion of previously filed employee benefit data and/or manually updated data to the user at the terminal 40 via the website for review. The website is configured to offer the user the following options: entry of electronic signature and transmission of the completed benefits form in a known manner to either to the user at the remote computer terminal 40 or to a designated party (e.g., DOL, IRS, plan administrator, etc.) via the interne; providing the electronic version of the completed employee benefits form to the user for a manual signature and subsequent submission of the employee benefit to a designated party; or automatic transmission of the completed employee benefits form via the interne connection 30 or other form of conveyance to a designated party for review. Step 280 includes the end of the method 200. It is understood that the above-described method 200 can be performed without using each of the above-described steps or in the above-described order of steps.

It is understood that the invention is not limited to the preferred system 20 for creating an employee benefit plan and method 200 of populating an employee benefits form described above. The system 20 and method 200 can be employed to create and/or populate various other forms and/or plans with previously filed data accessible to the public and is not limiting on the invention.

Many changes and modifications could be made to the invention without departing from the spirit thereof. The scope of these changes will become apparent from the appended claims.

I claim:

1. A system that prepares a Form-5500 in response to a request from a user at a remote computer terminal, comprising:

a server in support of a website accessible by the remote computer terminal via an internet connection, the server configured to:

transmit a request to an electronic public database implemented by a Department of Labor computing system via a communication over the internet connection, the request including an identification of previously filed benefit data;

receive the previously filed benefit data in flat file format from the electronic public database;

convert the previously filed benefit data into a format searchable and retrievable by the software running on the server;

store the converted previously filed benefit data into a database in the memory of the server;

receive from a remote computer terminal via the website supported by the server a request to populate Form-5500 with at least a portion of the previously filed data, the request to populate Form-5500 also including a filing party identification which includes at least one of an employer identification number identifier (EIN), a designation of an employer, or a designation of an employer benefit plan;

search the integrated database for a desired portion of the converted previously filed benefit data based on the filing party identification;

populate the plurality of entries of the electronic-version of the Form-5500 with the portions of the previously filed benefit data;

prompt the user at the remote terminal for manual entry of one or more entries of the Form-5500 in response to prompts from web pages of the website, where the manual entries are stored in the database;

display the completed electronic version of Form-5500 including the information from the desired portion of the converted previously filed benefit data and the information received by manual entry at the terminal via the website for review.

2. The system as recited in claim 1, wherein the server is configured to periodically update the database with previously filed benefit data from the public database via the internet connection.

3. The system of claim 1, wherein receiving the previously filed benefit data from the electronic public database includes receiving a substantially complete copy of the electronic public database.

4. The system of claim 1, wherein receiving the previously filed benefit data from the electronic public database includes receiving all benefit data for a calendar year stored in the electronic public database.

5. The system of claim 4, wherein storing the previously filed benefit data into database in the memory, includes generating a database having a plurality of previously file benefit data records, wherein each record is associated with a unique employer identification number.

6. A computer-implemented method that prepares a Form-5500, the method comprising:
  transmitting, by a software program stored on a non-transitory medium and executed by a processor of a sever, a request to an electronic public database implemented by a Department of Labor computing system via a communication over the internet connection, the request including an identification of previously filed benefit data;
  receiving, by the server's processor, the previously filed benefit data in flat file format from the electronic public database;
  converting, by the processor of the server, the previously filed benefit data into a format searchable and retrievable by the software running on the server;
  storing by the processor of the server, the previously filed benefit data into a database in the memory of the server;
  receiving, by the processor of the server, from a remote computer terminal via a website supported by the server a request to populate Form-5500 with at least a portion of the previously filed data, the request to populate Form-5500 also including a filing party identification which includes at least one of an employer identification number identifier (EIN), a designation of an employer, or a designation of an employer benefit plan;
  searching, by the processor of the server, the integrated database for a desired portion of the converted previously filed benefit data based on the filing party identification; and
  populating the plurality of entries of the electronic-version of the Form-5500 with information from the desired portion of the converted previously filed benefit data;
  prompting, by processor of the server, the user at the remote terminal for manual entry of one or more entries of the Form-5500 in response to prompts from web pages of the website, where the manual entries are stored in the database;
  displaying, by the processor of the server, the completed electronic version of Form-5500 including the information from the desired portion of the converted previously filed benefit data and the information received by manual entry at the terminal via the website for review.

7. The computer-implemented method as recited in claim 6, wherein the website is configured to offer the user the options of: entry of electronic signature and transmission of the completed Form-5500 via the internet to the user at the remote computer terminal or to a designated party, where the designated party is one of the Department of Labor, Internal Revenue Service, or a plan administrator; providing the electronic version of the completed Form-5500 to the user for a manual signature and subsequent submission of the employee benefit to the designated party; or automatic transmission of the completed Form-5500 via the internet connection to the designated party for review.

8. The computer-implemented method as recited in claim 6, wherein the step of receiving the previously filed benefit data from the electronic public database includes receiving a substantially complete copy of the electronic public database.

9. The computer-implemented method as recited in claim 6 further including periodically updating the database with previously filed benefit data from the public database via the internet connection.

10. The computer-implemented method as recited in claim 6, further including the step of wherein the step of receiving the previously filed benefit data from the electronic public database includes receiving all benefit data for a calendar year stored in the electronic public database.

11. The computer-implemented method as recited in claim 10, wherein storing the previously filed benefit data into an integrated database in the memory, includes generating a database having a plurality of previously filed benefit data records, wherein each record is associated with a unique employer identification number.

* * * * *